United States Patent Office 3,364,265
Patented Jan. 16, 1968

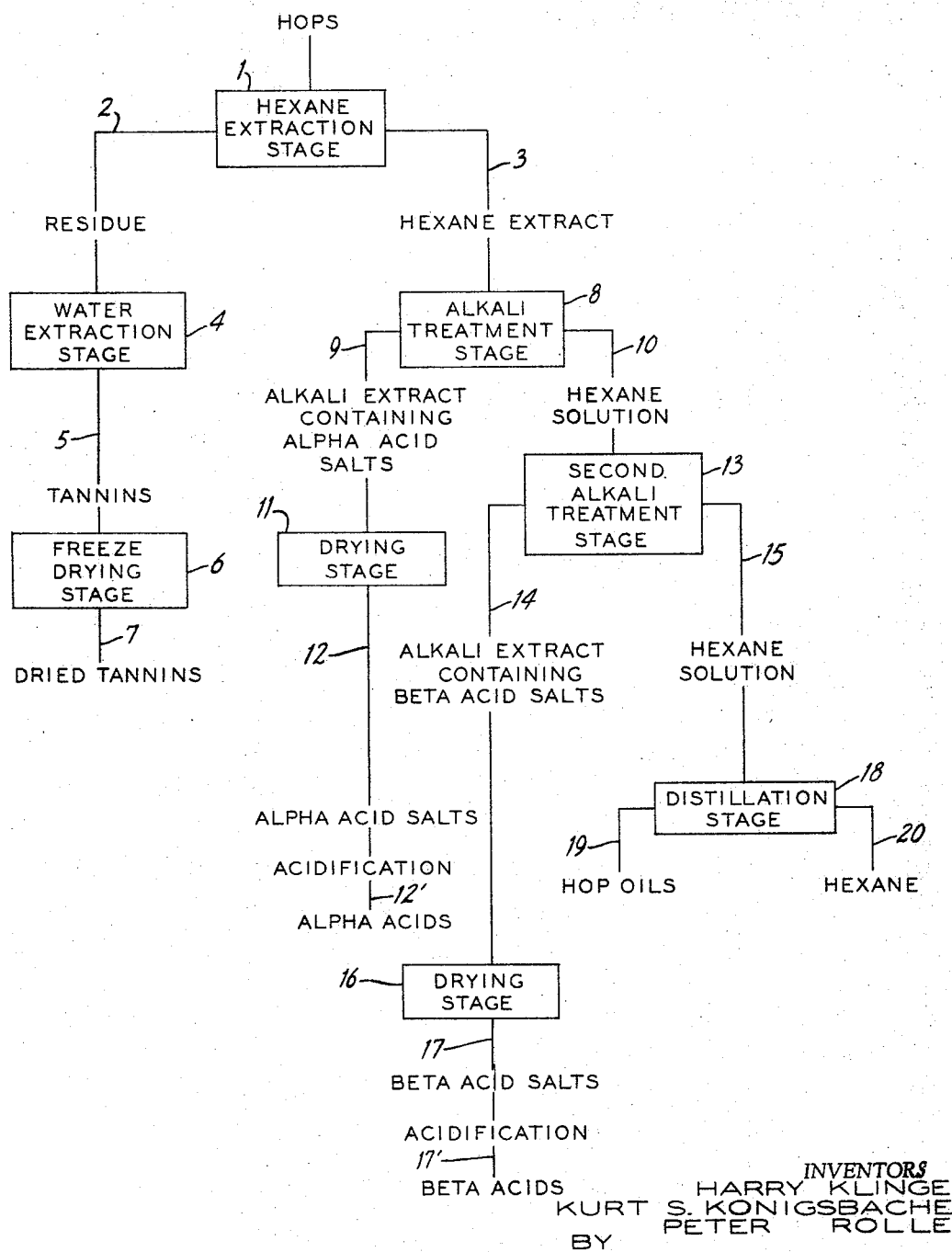

3,364,265
HOP CONSTITUENTS AND METHOD
OF MAKING SAME
Harry Klingel, Summit, N.J., Kurt S. Konigsbacher,
Stamford, Conn., and Peter Roller, Jamaica, N.Y.,
assignors to S. S. Steiner, Inc., New York, N.Y., a
corporation of New York
Continuation-in-part of application Ser. No. 217,013,
Aug. 15, 1962. This application June 22, 1964, Ser.
No. 379,427
11 Claims. (Cl. 260—586)

This application is a continuation-in-part of our copending application Ser. No. 217,013, filed Aug. 15, 1962, now abandoned.

This invention relates to a novel concept in the treatment of hops. The invention includes novel products obtained from hops and novel methods for producing such products.

In the present state of the art, whole or ground hops are added to the brew wort and the residues removed after the mixture is boiled for the desired length of time. This procedure is cumbersome, wasteful and time consuming. As the hops vary in their content, degree of maturity, etc., they produce different flavors in the beer, therefore making it difficult for brewers to reproduce the desired flavor in successive batches of beer. Furthermore, it is difficult to store whole hops for any length of time without obtaining some form of deterioration.

In order to combat these disadvantages, various extracts have been made from hops. These extracts have not been satisfactory substitutes for whole hops. They do not produce as good a flavor as whole hops. They are generally in a syrupy, viscous form which makes it difficult to add them to the brewery wort and to obtain a homogeneous distribution in the wort. In addition, these extracts do not remain entirely stable. Attempts have been made to obtain different types of extracts in order to separate components such as oils, tannins, acids, etc. These extracts have not been wholly accepted by the brewers who find that the best flavor is obtained by the addition of whole hops rather than any of these extracts.

Applicants' invention overcomes the disadvantages of the whole hop brewing procedure with none of the concurrent problems found in the present hop-extract processes. As will be readily apparent from the description which follows, the present invention provides relatively pure compounds in a form which is readily utilizable by the brewer.

More particularly, the present invention is concerned with providing methods for the separation of various hop components so that a separated component, particularly a product containing a high percentage of salt of alpha-acids described hereinafter, or a group of said separated components, may be added to brew wort in amounts desired at a stage in the process whereby it may be utilized most efficiently and will produce the most desirable properties in the finished beer with a high level of flavor control. It is contemplated that certain separated components may be added to beer at various stage in the manufacture, in the amounts desired to produce a controlled level of aromatic and bacteriostatic properties, etc. In short, the present invention enables one to produce a made-to-order beer, ale, or other malt beverage with respect to essentially all the properties which hops impart to malt beverages.

Objects and advantages of the invention will be set forth in part hereinafter and in part will be obvious herefrom, or may be learned by practice with the invention, the same being realized and attained by means of the steps, methods and compositions pointed out in the appended claims.

The invention consists in the novel steps, methods and compositions, combinations and improvements herein shown and described.

An object of this invention is to provide a novel method whereby a component may be separated from hops which is stable and contains a high percentage of salts of "hop-bitter acids" which are alpha-acids and/or isohumulones. Alpha-acids include humulone, co-humulone and ad-humulone. Isohumulones are alpha-acids which have been converted to their iso form by a suitable technique, e.g., by heat. A further object of this invention is to provide a novel method for the production of a stable powder containing as its principal component, salts of alpha-acids and/or isohumulones. A still further object of this invention is to provide novel stable products containing a high percentage of salts of alpha-acids and/or isohumulones. A still further object is to provide a novel stable powder containing as its principal components, salts of alpha-acids and/or isohumulones.

Another object of this invention is to provide a novel method whereby a component may be separated from hops which is stable and contains a high percentage of the salts of hop-bitter acids known as the beta-acids, including lupulone. A further object of this invention is to provide a novel method for the production of a stable powder containing as its principal component, salts of beta-acids, including lupulone. Yet a further object of this invention is to provide novel stable products containing a high percentage of salts of beta-acids. A further object is to provide a novel stable power containing as its principal component, salts of beta-acids.

A further object of this invention is to provide a novel method for the production of alpha-acids or beta-acids in the free acid state.

A further object is to provide a novel method for the separation of alpha-acids from beta-acids wherein both the alpha-acids and beta-acids are contained in a hop extract.

Another object of this invention is to provide novel methods and made-to-order mixtures (e.g., mixtures containing desired specific amounts of alpha-acids, beta-acids, tannins and hop oils) for producing a made-to-order beer, ale or other malt beverage with respect to essentially all the properties which hops impart to malt beverages.

The accompanying drawing is a flow sheet illustrating the general process used in this invention.

The present invention relates to a method for isolating and obtaining in high yields and purity alpha-acids and beta-acids from hops. More particularly, the steps employed in obtaining alpha-acids and beta-acids in high yields and purities are as follows:

(1) Extracting a mixture of alpha-acids and beta-acids from hops (e.g., ground kiln-dried hops) by the use of a suitable solvent, e.g., hexane; and (2) Determining the estimated amount of alpha-acids in the solvent extract; and (3) Combining the solvent extract containing the alpha- and beta-acids with an aqueous alkali solution containing an alkali metal hydroxide, preferably sodium hydroxide, in a stoichiometric amount based on the estimated amount of alpha-acids to form water-soluble salts of alpha-acids substantially free of beta-acid salts; and (4) Separating the alpha-acid salts substantially free of beta-acid salts from the hexane solution; and (5) Combining the hexane solution with an aqueous alkali solution containing an alkali metal hydroxide, preferably sodium hydroxide, to form water-soluble beta-acid salts substantially free of alpha-acid salts.

For convenience sake, in discussing hereinafter the alkali metal hydroxide, reference will be made to sodium hydroxide. It should be understood, however, that other equivalent hydroxide materials may be employed, e.g., potassium hydroxide.

From the above remarks, it is readily apparent that by the above procedure one can preferentially isolate and obtain alpha-acids and, later, beta-acids, in the form of sodium salts. That such preferential separation may be accomplished by the mere addition of the aforedescribed aqueous alkali solutions in quite surprising. The previous experience of other chemists in the treatment of a mixture of acids with a quantity of base insufficient for complete neutralization of said acids would lead one generally to anticipate the formation of the salts of both acids. This is particularly true when the two acids have similar structures. Thus, a clean separation of one of the components, as in the case at hand, it totally unexpected. On the contrary, however, it has been found that if the sodium hydroxide is in a stoichiometric amount based on the estimated alpha-acids, there results formation of alpha-acid salts substantially free of beta-acid salts. When the resulting hexane solution is separated from the alpha-acid salts and treated with an aqueous alkali solution containing sodium hydroxide, preferable in a stoichiometric amount based on the estimated beta-acids, there results the formation of beta-acid salts substantially free of alpha-acid salts.

The general method referred to hereinabove will now be described in greater detail, reference being made to the flow sheet illustrated in the accompanying drawing.

I. SOLVENT EXTRACTION

Hops are treated with a solvent capable of extracting alpha- and beta-acids. Preferably, the hops are in ground form to effect more efficient extraction of the desired components. The preferred solvent for this purpose is hexane. Other solvents may be used such as toluene and chloroform. For convenience sake, the method will be described employing hexane as the solvent. Accordingly, the first stage is a hexane extraction stage 1, as shown in the accompanying flow sheet. By this hexane extraction step there are produced two fractions, a hexane extract and a residue. The residue 2 and hexane extract 3 are then separated in any suitable manner, such as by filtration.

II. RESIDUE TREATMENT

The residue 2 containing water-soluble components is treated with hot water in a water extraction stage 4, whereby the water-soluble tannins 5 are extracted therefrom. The tannins are then recovered by freeze drying in a drying stage 6, or an equivalent technique whereby possible heat labile components of the tannins are not affected. The dried tannins 7 are in stable form and are available for inclusion in appropriate amounts in tailor-made mixtures for use by the brewer in the manner described hereinbefore.

III. HEXANE EXTRACT TREATMENT

The amount of alpha-acids and beta-acids in the hexane extract 3 is then estimated employing any standard test method for this purpose. The test method actually employed is the spectrophotometric method described in "Methods of Analysis of the American Society of Brewing Chemists," 6th revised edition, 1958, pages 138-A, 138-B, 138-C.

The hexane extract is then treated with successive alkali treatments as follows:

(a) First alkali treatment

The hexane extract is treated in an alkali treatment stage 8 with with an aqueous alkali solution containing sodium hydroxide in a stoichiometric amount based on the estimated amount of alpha-acids. This results in a mixture of (a) an aqueous alkali extract 9 containing the alpha-acid sodium salts, and (b) a hexane solution 10 substantially free of alpha-acids. The alkali extract 9 is then separated from the hexane solution by any suitable technique, e.g., use of a separatory funnel, and the extract 9 is dried in a drying stage 11 in order to obtain a powder 12 containing a high percentage of alpha-acid sodium salts by freeze drying. A freeze drying technique is employed since the salts are unstable to heat. Another suitable drying technique that may be employed is evaporation under vacuum.

The dried alpha-acid sodium salts 12 are in stable form and are available for addition in appropriate amounts to the wort at an appropriate stage of the brewing process.

(b) Second alkali treatment

The hexane solution 10 (with alpha-acids removed) is then treated in a second alkali treatment stage 13 with an aqueous alkali solution containing sodium hydroxide, preferably in a stoichiometric amount based on the estimated amount of beta-acids present in the hexane extract, in such concentration to remove from the hexane solution beta-acids in the form of sodium salts. This results in a mixture of (a) an aqueous alkali extract 14 containing the beta-acid sodium salts, and (b) a hexane solution 15 substantially free of alpha-acids and beta-acids. The alkali extract 14 is then separated from the hexane solution by any suitable technique, e.g., use of a separatory funnel, and the alkali extract is dried in a drying stage 16 in order to obtain a powder 17 containing a high percentage of beta-acid sodium salts. The same drying technique may be used as employed in obtaining the alpha-acid powder described hereinbefore.

The dried beta-acid sodium salts are in stable form and are available for addition, in appropriate amounts, to the wort or beer at an appropriate stage of the brewing process.

IV. HEXANE SOLUTION TREATMENT

The hexane solution is then fractionally distilled in a distillation stage 18 whereby hop oils 19 and hexane 20 are recovered. The hop oils are available for inclusion in appropriate amounts in tailor-made mixtures for use by the brewer in the manner described hereinbefore.

If so desired, the free acids of the alpha-acid salts and beta-acid salts produced in accordance with this invention may be obtained by neutralizing the salts. More particularly, as shown in the accompanying flow sheet, the alpha-acid salts 12 and beta-acid salts 17 may be neutralized by acidification to give the free alpha-acids 12' and free beta-acids 17' which may themselves be used after having been brought to a stable form.

In determining stoichiometric amount in the examples which follow, we have taken into account the complexity of the mixture known as alpha-acids and the presence of small quantities of extraneous acidic materials. Accordingly, we have based the stoichiometric amount of sodium hydroxide on the molecular weight of humulone and have added up to 10% in excess of sodium hydroxide.

EXAMPLE I 1,000 grams of dried hops (7.41% alpha- acids, 5.53% beta acids by A.S.B.C. assay) were ground to a powder and extracted with hexane by stirring several hours and filtering. This process was twice repeated and the combined hexane extracts were distilled in vacuum to a volume of 3,000 ml. The solution contained 5.5% solids (a total of 166.5 grams). The solids assayed 45.60% alpha-acids and 29.17% beta-acids by A.S.B.C. assay.

180 ml. of the above hexane solution contain 10 grams of total solids, 4.56 grams of alpha-acids and 2.91 grams of beta-acids. The amounts of normal sodium hydroxide equivalent to these acids are:

|  | Ml. |
|---|---|
| Alpha-acids | 12.6 |
| Beta-acids | 7.0 |

(A) To the 180 ml. of hexane solution there were added 13 ml. of normal sodium hydroxide and 25 ml. of water, the mixture stirred at 25° C. for 10 minutes, separated, and the hexane layer was washed with 10 ml.

of water. The combined water extracts were freeze dried by freezing in a Dry Ice-acetone bath and drying under a high vacuum.

(B) To the hexane solution remaining from extraction A were added 7.0 ml. of normal sodium hydroxide and 15 ml. of water and the extraction, washing, separation and freeze drying conducted as described under A.

(C) To the hexane solution remaining from extraction B there were added 7.0 ml. of normal sodium hydroxide and 15 ml. of water and the process described under A repeated.

The following table summarizes the results:

|   | Weight Dry, Grams | Percent Alpha-Acids | Percent Beta-Acids | Percent Recovery Alpha-Acids | Percent Recovery Beta-Acids |
|---|---|---|---|---|---|
| A | 5.0 | 83.4 | 0 | 91.4 | |
| B | 2.6 | 0 | 80.0 | | 71.5 |
| C | 1.2 | 0 | 42.6 | | 17.5 |
| Total | 8.8 | | | 91.4 | 89.0 |

This example demonstrates the sharpness of the separation obtainable by the newly contrived procedure, also the fact that the yields are excellent, particularly in the case of the alpha-acids.

EXAMPLE II 180 ml. of the hexane solution as prepared for Example I were extracted with portions of dilute sodium hydroxide as in Example I, but the extractions were conducted at a temperature of 45° C. Results are summarized in the following table:

|   | Weight Dry, Grams | Percent Alpha-Acids | Percent Beta-Acids | Percent Recovery Alpha-Acids | Percent Recovery Beta-Acids |
|---|---|---|---|---|---|
| A | 5.0 | 87.07 | 0 | 95.2 | |
| B | 2.85 | 0 | 71.66 | | 70.0 |
| C | 1.3 | 0 | 16.24 | | 7.2 |
| Total | 9.15 | | | 95.2 | 77.2 |

At 45° C. the yield and purity of the alpha-acids were superior to those at 25° C. This is partly due to the greater ease of separation of the two layers at the higher temperature. The total recover of beta-acids is smaller at the higher temperature. There is little or no isomerization of alpha-acids to isohumulones under the conditions of this experiment.

EXAMPLE III 180 ml. of the hexane solution as prepared for the previous examples was evaporated to dryness under high vacuum. The 10 grams of material thus obtained were dissolved in 180 ml. of V.M. & P. naphtha. On this solution the extractions with aliquots of dilute alkali were conducted as in Example I, but the entire extraction operations were carried out at a temperature of 90° C. The resultant solutions were freeze dried as before. The following table summarizes the results:

|   | Weight Dry, Grams | Percent Alpha-Acids | Percent Beta-Acids | Percent Recovery Alpha-Acids | Percent Recovery Beta-Acids |
|---|---|---|---|---|---|
| A | 4.8 | 45.6 | 0 | 48 | |
| B | 1.7 | 0 | 23.6 | | 13.7 |
| C | 2.2 | 0 | 33.2 | | 25.1 |
| Total | 8.7 | | | 48 | 38.8 |

As the above figures show, there has been no loss of weight of material but there has been considerable loss of alpha- and beta-acids. The determinations of alpha- and beta-acids in the above, as in all assays in the examples, has been conducted by the official A.S.B.C. method. The spectrophotometric curves as obtained by the A.S.B.C. technique indicated that isohumulones were present. Rigby and Bars (A.S.B.C. proceedings 1961, 46–50) described a method of determining alpha-acids and isohumulones. Their method applied to fraction A yielded the following results:

|   | Weight, Grams | Percent Alpha-Acids | Percent Iso-humulones | Percent Recovery Alpha-Acids and Iso-humulones |
|---|---|---|---|---|
| A | 4.8 | 52.1 | 22.7 | 84.2 |

What the above figures indicate is that much isomerization has taken place during the comparatively short period of extraction at 90° C. This experiment is, in part, an isomerization of alpha-acids under buffered conditions in which the beta- and other hop-acids act as buffers to prevent over-alkalinization. This experiment also shows that alpha-acids containing isohumulones may be freeze dried as their sodium salts without decomposition.

EXAMPLE IV 300 grams of ground hops were extracted three times with hexane by stirring at room temperature and filtering each time. The extracts were combined and distilled in a vacuum to a volume of 1,000 ml.

Estimated alpha-acids (according to A.S.B.C. assay of the hops) 22.23 grams which is equivalent to 60 ml. of normal sodium hydroxide.

The hexane solution was stirred ten minutes with 50 ml. of normal sodium hydroxide plus 50 ml. of water. The aqueous portion was separated and the extraction of the hexane repeated with 16 ml. of normal sodium hydroxide plus 20 ml. of water. The aqueous portion was separated and the hexane washed with 40 ml. of water. The aqueous portions were combined, filtered and freeze dried.

The weight of dry material was 26.0 grams (A.S.B.C. assay).

```
                                                        Percent
Alpha-acids _____ 79.5
Beta-acids _____ 0.4
```

This represents a 93% recovery of the alpha-acids present in the hops.

The sodium salt as obtained above was dissolved in water, the solution acidified and then extracted with ether and the ether extract dried. A yield of 93.7% of free acids was obtained as a thick oil. This material had a specific rotation of −180°. Humulone displays a specific rotation of −225°. Thus, the optical rotation and the spectrophotometric assay are substantially in agreement.

The amount of sodium present in the sodium salt as determined by assay was 6.04% which agrees well with the 93.2% of free acid obtained.

The hexane solution which had been extracted with alkali was further extracted with dilute sodium hydroxide until no extractable material remained in the hexane. The hexane solution was washed free of alkali with water and then distilled through a fractionating column to a volume of 60 ml. The 60 ml. was then concentrated in a vacuum of 20 ml. or less until of constant weight. The material thus obtained was extracted with 90% methanol and the methanol extract was concentrated in a vacuum of 20 ml. or less to yield 2 grams of a thick oil suitable for imparting a hop aroma to beer, either as such or after further treatment.

The original hops which had been extracted with hexane were dried in air to remove hexane and then were extracted by treating with 600 ml. of hot water, holding at 65° C. for 16 hours, filtering and washing with hot water. (The temperature was held at 65° C. to prevent microbiological growth.) The total water extract thus obtained was freeze dried to yield 52.8 grams. This material contains all of the water-soluble hop tannins and represents a useful additive to wort to produce the so-called "hot break."

EXAMPLE V 180 ml. of the hexane solution as prepared for Example I and containing 4.56 grams of alpha-acids and 2.91 grams of beta-acids (A.S.B.C. assay) were treated with an amount of dilute sodium hydroxide equivalent to all of the hop acids present. Thus the hexane solution was stirred for 10 minutes with 27 ml. of normal sodium hydroxide and 55 ml. of water at 25° C. The aqueous portion was separated, filtered and freeze dried.

Weight of dry material (A.S.B.C. assay) ___grams__ 8.2
Alpha-acids _____percent__ 34
Beta-acids _____do____ 31

This represents a recovery of only 61% of the original alpha-acids and a recovery of 89% of the beta-acids. In Example I, wherein the same total quantity of sodium hydroxide was used, the recovery of alpha-acids was 91.4%. This demonstrates that considerable decomposition of alpha-acids takes place in the presence of alkali. The assay does not show any significant quantity of isohumulones to be produced under the above experimental conditions. Obviously, no separation of alpha-acids from beta-acids has taken place.

EXAMPLE VI 360 ml. of a hexane extract of hops containing (according to the A.S.B.C. assay) 8.88 grams of alpha-acids and 6.63 grams of beta-acids were treated by stirring with a portion of dilute sodium hydroxide equivalent to 2.7 grams of alpha-acids, separating and repeating with additional similar portions of dilute sodium hydroxide to a total of four extractions. The aqueous extracts were separately freeze dried.

For each extraction 8 ml. of normal sodium hydroxide and 20 ml. of water were used. The dried samples were assayed by the A.S.B.C. method. The following table summarizes the results:

|   | pH of Solution | Weight Dry | Percent Alpha-Acids | Percent Beta-Acids | Percent Recovery of Alpha-Acids |
|---|---|---|---|---|---|
| A | 8.15 | 2.0 | 89.1 | 0 | 20.0 |
| B | 8.5 | 3.3 | 88.2 | 0 | 32.7 |
| C | 9.25 | 3.4 | 72.7 | 0 | 27.9 |
| D | 10.5 | 3.2 | 30.0 | 53.5 | 10.8 |
| Total | | 11.9 | | | 91.4 |

This experiment demonstrates that alpha-acids were selectively extracted when small increments of alkali are used. It will be noticed that the pH of the extracts varies over a fairly wide range without yielding any indication of the relative percent of alpha-acid being extracted. It has been demonstrated in Examples I, II and IV that over 90% of the alpha-acids and none of the beta-acids (as shown by the A.S.B.C. assay) can be extracted by use of the proper quantity of sodium hydroxide.

EXAMPLE VII 180 ml. of the hexane extract of hops as prepared for Example IV were extracted with portions of dilute alkali as in Example I, except that normal potassium hydroxide was used in place of sodium hydroxide.

The results were as follows:

|   | Weight, Grams | Percent Alpha-Acids | Percent Beta-Acids | Percent Recovery Alpha | Percent Recovery Beta |
|---|---|---|---|---|---|
| A | 5.3 | 76.4 | 0 | 80.0 | |
| B | 2.8 | 8.8 | 59.3 | 5.4 | 57.0 |
| C | 1.5 | 0.0 | 40.8 | | 20.7 |
| Total | 9.6 | | | 85.4 | 77.7 |

This experiment demonstrates that potassium hydroxide is slightly less efficient than sodium hydroxide in separating alpha- and beta-acids under equivalent conditions.

EXAMPLE VIII 180 ml. of a hexane extract of hops as prepared for Example I were extracted with portions of dilute sodium hydroxide in the same manner as in Example I, but the extractions were conducted at 65° C. The results were as follows:

|   | Weight, Grams | Percent Alpha-Acids | Percent Beta-Acids | Percent Recovery Alpha | Percent Recovery Beta |
|---|---|---|---|---|---|
| A | 4.9 | 75.5 | 0 | 79.0 | |
| B | 2.2 | 3.27 | 44.18 | 1.5 | 54.8 |
| C | 1.2 | 0 | 56.17 | | 38.0 |
| Total | 8.3 | | | 80.5 | 92.8 |

As the above experiment shows, the recovery of alpha-acids is not as good at 65° C. as at 45° C. The spectrophotometric curves indicated that about 10% of the alpha-acids originally present have been converted to isohumulones.

EXAMPLE IX

To 1,000 ml. of a routine unhopped brewers' wort, there were added 100 milligrams of the material obtained as described in Example IV. According to the A.S.B.C. assay, this contained 79.5 milligrams of alpha-acids and 0.4 milligram of beta-acids, and is the equivalent of 1,160 milligrams of hops per liter of wort (or of 0.3 pound of hops per barrel of wort). The treated wort was boiled under reflux for 5 hours, cooled, and a filtered sample assayed according to the Rigby and Bars procedure (A.S.B.C. proceedings 1961, 46–50).

A sample of similar wort treated with 0.3 pound of hops per barrel of wort and boiled at the brewery was analyzed in the same manner.

The laboratory treated wort showed:

|   | P.p.m. |
|---|---|
| Isohumulones | 45.6 |
| Alpha-acids | 16.0 |

The brewery treated wort showed:

|   | P.p.m. |
|---|---|
| Isohumulones | 28.3 |
| Alpha-acids | 10.4 |

The aforedescribed example demonstrates that the loss of bittering agents in the transition from hops to wort is considerably smaller when the alpha-acids have been extracted by the procedure outlined in accordance with this invention.

EXAMPLE X

In Example III it was noted that isomerization had taken place and fraction A contained 23.7% isohumulones according to the Rigby assay, as well as 45.6% alpha-acids by the A.S.B.C. assay.

3.0 grams of fraction A obtained in the experiment described in Example III (containing 1.370 grams of alpha-acids and .715 gram of isohumulones) were dissolved in water, acidified with hydrochloric acid and extracted with three portions, each 50 ml., of hexane. The hexane solution thus obtained was freed of hydrochloric acid by shaking with water and separating. The hexane extract was stirred 10 minutes with 3.3 ml. of normal sodium hydroxide plus 10 ml. of water. After separation, the hexane was washed with 5 ml. of water. The combined aqueous portions were filtered and freeze dried.

This extraction and separation was repeated with another portion of 3.3 ml. of normal sodium hydroxide and 10 ml. of water plus the use of 5 ml. of water for washing. The combined extracts were also filtered and freeze dried.

The quantity of sodium hydroxide used in each extraction was equivalent to 1.2 grams of alpha-acids (or isohumulones). Following is the analysis of the dried sample.

|   | Weight, Grams | Percent Alpha-Acids A.S.B.C. Assay | Percent Isohumulones Rigby Assay |
|---|---|---|---|
| 1 | 1.2 | 26.83 | 37.70 |
| 2 | 1.2 | 54.50 | 11.46 |

This experiment indicates that the isohumulones are preferentially extracted by dilute sodium hydroxide but the separation is not sharp, as shown by the fact that some isohumulones are present in fraction 2.

EXAMPLE XI

A hexane extract of hops which showed by A.S.B.C. assay 2.53% alpha-acids and 1.62% beta-acids was allowed to stand in a bottle exposed to diffused daylight for 6 weeks. At this time a filtered sample showed:

|   | Percent |
|---|---|
| Alpha-acids by A.S.B.C. assay | 1.48 |
| Beta-acids by A.S.B.C. assay | 0 |
| Isohumulones by Rigby assay | 1.46 |

A portion of 180 ml. of the above solution (containing 2.66 grams of alpha-acids according to the A.S.B.C. assay and 2.63 grams of isohumulones according to the Rigby assay) was stirred 10 minutes with 8 ml. of normal sodium hydroxide and 15 ml. of water, separated, and the hexane solution washed with 5 ml. of water. The aqueous portions were combined, filtered and freeze dried. The hexane solution was then treated in a similar fashion with another 8 ml. portion of normal sodium hydroxide.

The analytical results were as follows:

|   | Weight, Grams | Percent Alpha-Acids A.S.B.C. Assay | Percent Isohumulones Rigby Assay |
|---|---|---|---|
| A | 2.1 | 9.0 | 55.1 |
| B | 3.8 | 40.9 | 19.2 |

This experiment demonstrates that mixtures of alpha- and isohumulones can be separated but not in the precise manner with which mixtures of alpha- and beta-acids can be separated.

It is seen, therefore, that this invention relates to isolation of alpha-acids from beta-acids from a solvent extract containing both acids, based on combining with said extract, an aqueous alkali solution containing an alkali metal hydroxide, preferably sodium hydroxide, in a substantially stoichiometric amount based on an estimated amount of alpha-acids present in the solvent extract. In general, a single alkali extract treatment is employed for isolating the alpha-acids, i.e., the alkali metal hydroxide is in an amount approximating the aforementioned stoichiometric amount. This does not exclude, however, incremental isolation of the alpha-acids by employing a number of alkali extract treatments wherein the alkali metal hydroxide present for each treatment is less than the stoichiometric amount. When such technique is used, the total of alkali metal hydroxide used in the plurality of alkali extraction steps should not exceed the stoichiometric amount if one wishes to isolate only alpha-acids.

It should be understood that this invention includes techniques for isolation of alpha-acids, isohumulones, or mixtures of alpha-acids and isohumulones. As described hereinbefore in detail, whether or not alpha-acids alone are isolated, or some isohumulones are also present, depends upon the temperature of the alkali extract treatment. In general, temperatures up to about 50° C. give only the alpha-acids, while at higher temperatures, e.g. 60° C. or above, mixtures of alpha-acids and isohumulones are obtained.

From the disclosures of Examples III, IX, X and XI, it is seen that the alpha-acid salts in solution when subjected to elevated temperatures are converted to a significant extent to their isohumulone salts. More specifically, this is accomplished in the aforementioned examples by carrying out the alkali extract treatment at elevated temperatures. The examples which follow exemplify an alternative technique for effecting substantial conversion of alpha-acid salts to their isohumulone salts, and which affords certain advantages over the hereinbefore mentioned technique of carrying out the alkali extract treatment at elevated temperature.

Broadly, the process exemplified by the examples which follow, comprises subjecting a solution of alpha-acid salts to an elevated temperature, preferably at, or near, reflux temperature, for a sufficient period of time to effect substantial conversion of said salts to isohumulone salts. In general, the solution of the alpha acid salts is heated at such elevated temperatures for at least three hours if no excess alkali is added to the solution. The addition of an alkali such, for example, as sodium carbonate, permits the time of heating to be reduced substantially, e.g. to twenty minutes. In general, the period of heating is not substantially greater than six hours in order to prevent break down of the desired components into undesired waste products. As will be apparent from a comparison of Examples XII and XIII, it has been found that passing an inert gas such as nitrogen through the solution of the salts during the heating period assists in preventing decomposition of the desired products.

As is readily apparent from the examples which follow, the resulting solutions comprising predominant amounts of isohumulone salts, may be dried in the manner described hereinbefore to form stable powders. Actually, the isohumulone salt content of some of these examples is so high compared to the remaining components it may be accurately referred to as isohumulone salt powder.

In the examples which follow, Examples XII actually describes the alkali extraction step at room temperature of the hexane solution, after which the aqueous solution containing the alpha acid salts is first separated from the hexane solution before subjected to isomerization. It is observed that the process of Example XII is different from the process of the prior examples relating to isomerization in that the alkali extraction is carried out at room temperature instead of elevated temperatures and the isomerization is effected in the absence of the hexane solvent which helps in obtaining products of good purity.

In the remaining Examples XIII to XVI which follow, the aqueous solution of alpha acids was obtained from freeze dried alpha acid powder obtained in the manner described hereinbefore in detail. The freeze dried material was employed because of the inherent instability of salts of alpha acids in solution which makes storage thereof undesirable.

In each of the examples which follow, the alpha-acids and isohumulones referred to therein are in the form of their sodium salts. The calculations regarding these components, however, were carried out on the free acids for convenience sake.

EXAMPLE XII 200 grams of hops were extracted three times with hexane. The volume of the hexane extract was 600 ml. which assayed as containing 14.39 grams alpha-acid and 9.72 grams beta-acid. The hexane extract was mixed with agitation with 123 ml. N/3 NaOH (41 ml. of one normal NaOH and 82 ml. of water.) The water layer was separated from the hexane layer. The hexane layer was washed with 20 ml. of water, after which the resulting water layer is separated from the hexane layer. The above-mentioned two water layers are then combined and diluted by water addition to 200 ml. Assay according to the A.S.B.C. procedure showed the presence of 12.40 grams of alpha-acids. Assay according to the procedure of Rigby showed the presence of 12.14 grams of alpha-acids and no isohumulones. The solution, without added alkali was boiled under reflux (100° C.) for seven hours. No protection by means of an inert gas was provided. Samples were withdrawn and assayed from time to time. The following table shows the results of the assays by the Rigby method (the A.S.B.C. method is inapplicable in the presence of isohumulones) expressed as percentages of the original material.

| Time (hours) | Rigby alpha | Rigby iso | Total |
|---|---|---|---|
| 0 | 100.0 | 0 | 100.0 |
| 1 | 69.8 | 33.5 | 103.3 |
| 2 | 44.8 | 54.6 | 99.4 |
| 2.5 | 31.6 | 62.6 | 94.2 |
| 4 | 18.4 | 81.7 | 100.1 |
| 7 | 6.5 | 77.6 | 84.1 |

This experiment demonstrates the conversion of alpha-acids to isohumulones by means of heating a solution of the sodium salts as normally obtained in our process without the addition of excess alkali or of a buffer salt and without protection by means of an inert gas. It is noted that at a 7 hours' heating period decomposition becomes apparent.

EXAMPLE XIII

The following examples illustrates isomerization of a solution of alpha-acids by the same technique illustrated in Example XII, except that nitrogen is bubbled through the solution to assist in preventing decomposition of the desired product.

15 grams of freeze dried sodium alpha-acids representing material obtained from 200 grams of hops by the process described in Example I (of the patent) and assaying as 78.42% alpha-acids and 3.81% isohumulones were dissolved in water to a total volume of 1185 ml. Nitrogen was bubbled through the solution throughout the experiment. The solution was heated to 100° C. under reflux for six hours. Samples were withdrawn and assayed hourly. The following table shows the results of the assays by the method of Rigby and Bars.

| Time (hours) | Rigby alpha | Rigby iso | Total |
|---|---|---|---|
| 0 | 94.8 | 5.1 | 99.9 |
| 1 | 55.6 | 42.9 | 98.5 |
| 2 | 34.1 | 63.8 | 97.9 |
| 3 | 24.0 | 76.6 | 100.6 |
| 4 | 17.6 | 80.7 | 98.3 |
| 5 | 13.9 | 85.8 | 99.7 |
| 6 | 11.3 | 88.2 | 99.5 |

At the end of six hours, the solution was cooled, placed in a tray, and freeze dried to yield 13.4 grams (some loss due to removal of samples) to a light yellow powder comprising principally sodium salts, the assay of the powder showing:

Percent
Alpha-acid _____ 8.00
Isohumulones _____ 73.36

In the above-described process, instead of employing freeze drying, spray drying may be used if so desired.

The above-described process demonstrates freeze drying of the salts without isolation of the acids.

EXAMPLE XIV

The following example illustrates that the time for effecting isomerization may be substantially reduced by adding to the aqueous solution of the alpha-acid salts, an alkali such as sodium carbonate.

10 grams of freeze dried sodium alpha-acids prepared as in Example I (of this patent) were added to 850 ml. of 0.53% sodium carbonate solution which had been heated to 100° C. A stream of nitrogen was bubbled through the solution at all times. The mixture was held at 100° C. for 20 minutes, then cooled to room temperature and poured onto a mixture of 500 grams of ice and 20 grams of concentrated hydrochloric acid. The isohumulones were extracted with methylene chloride and the extract evaporated under vacuum to a yellow oil, weight 8.2 grams. The oil was dissolved in 50 ml. of methanol to which was added N/1 methanolic sodium hydroxide to litmus neutrality. The resulting mixture evaporated under vacuum to a yellow powder consisting essentially of the sodium salts of isohumulones.

Assay: Percent
Alpha-acids _____ 2.66
Isohumulones _____ 81.64

The powder is slightly soluble in water and readily soluble in alcohol. A water solution of this product at a concentration of 20 parts per million displays a bitterness about equal to an average beer.

EXAMPLE XV

The following examples relate to the purification of the powder formed in accordance with the process of Example XIV.

17 grams of the dry sodium salts of isohumulones prepared as described in Experiment XIV and assaying 81.12% isohumulones and 4.0 % alpha-acids were dissolved in 85 ml. of methanol. To this is added N/1 hydrochloric acid equivalent to the alpha-acids present (5.5 ml.). 50 ml. of water are then added and the solution is extracted twice with 100 ml. of hexane each time. The hexane layer is then discarded. To the solution are added 125 ml. of methanol and 40 ml. of concentrated hydrochloric acid.

The total mixture is then extracted three times with 100 ml. of hexane each time. The hexane extracts are combined and washed three times with 100 ml. of water each time. The hexane solution is then evaporated under vacuum to a yellow oil. Weight 9.0 grams. The yellow oil is dissolved in 50 ml. of methanol with the addition of N/1 methanolic sodium hydroxide to litmus neutrality. The resulting product is evaporated under vacuum to a yellow powder of sodium salts of isohumulones.

Assay: Percent
Isohumulones _____ 87.89
Alpha-acids _____ 1.08

EXAMPLE XVI

The following example illustrates the preparation of an isohumulone salt powder of excellent purity.

40 grams of freeze dried sodium alpha-acids prepared as in Example I and assaying 78.42% alpha-acids and 3.81% isohumulones were dissolved in 1000 ml. of water and 0.2 gram of sodium carbonate were added. The mixture was heated to 100° C. under reflux with bubbling in nitrogen gas throughout for three hours.

The solution was cooled and carbon dioxide was bubbled in at the same time. The solution was extracted twice with 250 ml. of hexane each time. The hexane is evaporated under vacuum leaving the following product: Weight 5.5 grams; assay 7.33% alpha, 42.98% isohumulones.

To the extracted solution was added 10 grams of concentrated hydrochloric acid. The acidified solution was extracted twice with 250 ml. of hexane each time. The hexane extracts are combined and washed with: 100 ml. normal hydrochloric acid mixed 100 ml. methanol. The washed product was further washed with a mixture of 100 ml. water and 100 ml. methanol. The hexane solution was further washed with water until free of mineral acid and evaporated under vacuum to a yellow oil. Weight 19.0 grams. The yellow oil was dissolved in 100 ml. methanol, with the addition of N/1 methanolic sodium hydroxide until litmus neutral. The resulting product was then evaporated under vacuum to a yellow powder. Weight 19.0 grams.

| Assay: | Percent |
|---|---|
| Alpha-acids [1] | 1.92 |
| Isohumulones | 91.50 |

[1] When the above sample was tested by the "Reverse Phase Chromatography" technique, the test showed no alpha-acids to be present. This indicates the possibility of error employing the Rigby method for determining alpha-acid content due to the limitations normally encountered when employing a mechanical equipment for measurement.

As indicated hereinbefore, the hop components obtained in accordance with this invention are used in the brewing of malt beverages. While the present invention is primarily concerned with the brewing of alcoholic malt beverages, the components have other uses, such, for example, as for brewing of non alcoholic malt beverages. When used in the brewing of malt beverages, alcoholic or non-alcoholic, the alpha-acids and beta acids are added to the brewing either in the powder form, i.e., the alkaline salt form, or in the oil form, i.e., the free acid form obtained by acidification of the salt. The free acids may be brought to powder form by absorption on inert materials. The free acids may be encapsulated with suitable materials, such as maltodextrin. If so desired, the hop oils and tannins obtained in accordance with this invention may also be added to the brewing wort.

The alpha-acids, or the isohumulones, or a mixture of the two in the form of salts or free acids, may also be added to food compositions as flavoring additives. Then, too, the beta-acids, which possess bacteriostatic properties, in the form of salts or free acids, may be added to compositions, e.g. beer, wherein the inhibition of bacteria is desired. The hop oils may be added to compositions, e.g., perfumes, for the purpose of imparting thereto an aromatic aroma.

The principles of this invention are applicable to any form of hops normally used in the brewing art. Examples of such forms are dried hops (ground or whole), fresh hops (green hops), frozen hops and lupulin (dried or fresh), etc.

The invention in its broader aspects is not limited to the specific steps, methods and compositions described, but departures may be made therefrom within the scope of the accompanying claims without departing from the principles of the invention and without sacrificing its chief advantages.

What is claimed is:

1. A method for obtaining the water soluble salts of alpha-acids substantially free of beta-acid salts from a solvent extract of hops containing a mixture of alpha-acids and beta-acids, said solvent being selected from the group consisting of hexanes, toluene and chloroform, said method comprising combining with said solvent extract an aqueous solution consisting essentially of water and an alkali metal hydroxide, the latter in a substantially stoichiometric amount based on an estimated amount of alpha acids present in the solvent extract to form (1) an aqueous alkali extract containing water soluble salts of alpha-acids, substantially free of beta-acid salts, and (2) a solvent solution containing beta acids.

2. The method according to claim 1, wherein the alkaline hydroxide is sodium hydroxide.

3. The method according to claim 1, wherein the solvent is hexane.

4. The method according to claim 1, wherein the temperature of the aqueous alkali solution is sufficiently high that the salts obtained are a mixture of salts of alpha-acids and salts of isohumulones.

5. The method according to claim 1, wherein the aqueous alkali extract is separated from the solvent solution, and the separated extract is subjected to a drying technique whereby there is obtained the salts of alpha-acids in powder form.

6. The method according to claim 1, wherein the solvent solution is separated from the aqueous alkali extract, and the separated solvent solution is combined with a second aqueous solution consisting essentially of water and an alkali metal hydroxide, the latter in an amount sufficient to form (1) a second aqueous alkali extract containing a substantial amount of water-soluble salts of the beta-acids, and (2) a solvent solution.

7. A method for obtaining the sodium salts of alpha-acids substantially free of beta-acid salts from a hexane extract of hops containing a mixture of alpha-acids and beta-acids comprising: combining with said hexane extract an aqueous solution consisting essentially of water and sodium hydroxide, the latter in a substantially stoichiometric amount based on an estimated amount of alpha-acids present in the hexane extract to form (1) an aqueous alkali extract containing sodium salts of alpha-acids substantially free of beta-acid salts, and (2) hexane solution containing beta-acids.

8. The method according to claim 7, wherein the temperature of the aqueous alkali solution is sufficiently high that the sodium salts obtained are a mixture of the sodium salts of alpha-acids and the sodium salts of isohumulones.

9. The method according to claim 7, wherein the hexane solution is separated from the aqueous alkali extract, and the separated hexane solution is combined with a second aqueous solution consisting essentially of water and sodium hydroxide, the latter in an amount sufficient to form (1) an aqueous alkali extract containing a substantial amount of the sodium salts of beta-acid, and (2) hexane solution.

10. The method of producing alkali metal salts of isohumulones comprising subjecting an aqueous solution containing the alkali metal salts of alpha-acids obtained in accordance with the method of claim 1 to an elevated temperature for a sufficient period of time to effect substantial conversion of said alpha-acid salts to isohumulone salts.

11. The method of claim 10, wherein the resulting mixture is subjected to a drying technique whereby there is obtained the alkali metal salts of isohumulones in powder form.

References Cited

FOREIGN PATENTS 619,563    5/1961    Canada.

OTHER REFERENCES

Cook et al.: "Jour. Chem. Soc." (London), pp. 1873–6 (1950).

LEON ZITVER, *Primary Examiner.*

M. M. JACOB, *Assistant Examiner.*